US012157147B2

(12) United States Patent
Sadamaru et al.

(10) Patent No.: US 12,157,147 B2
(45) Date of Patent: Dec. 3, 2024

(54) SORTING APPARATUS

(71) Applicant: SATAKE CORPORATION, Tokyo (JP)

(72) Inventors: Masaaki Sadamaru, Tokyo (JP); Yoshikazu Tateishi, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 0 days.

(21) Appl. No.: 18/258,937

(22) PCT Filed: Dec. 14, 2021

(86) PCT No.: PCT/JP2021/045937
§ 371 (c)(1),
(2) Date: Jun. 22, 2023

(87) PCT Pub. No.: WO2022/138306
PCT Pub. Date: Jun. 30, 2022

(65) Prior Publication Data
US 2024/0042490 A1 Feb. 8, 2024

(30) Foreign Application Priority Data
Dec. 25, 2020 (JP) ................. 2020-216333

(51) Int. Cl.
*B07C 5/342* (2006.01)
*B07C 5/34* (2006.01)
*B07C 5/36* (2006.01)

(52) U.S. Cl.
CPC .......... *B07C 5/3425* (2013.01); *B07C 5/3416* (2013.01); *B07C 5/366* (2013.01)

(58) Field of Classification Search
CPC ..... B07C 5/3425; B07C 5/3416; B07C 5/342; B07C 5/366; B07C 5/363
See application file for complete search history.

(56) References Cited

U.S. PATENT DOCUMENTS 5,353,937 A * 10/1994 Childress ................ B07C 5/366
  209/587
6,100,488 A    8/2000 Satake et al.
2018/0243800 A1* 8/2018 Kumar .................... G06N 20/00

FOREIGN PATENT DOCUMENTS

JP    11-179292 A    7/1999
JP    2000-157936 A    6/2000
(Continued)

OTHER PUBLICATIONS

International Search Report corresponding to International Application No. PCT/JP2021/045937 mailed Feb. 8, 2022, including English translation.

(Continued)

*Primary Examiner* — Michael McCullough
*Assistant Examiner* — Jessica L Burkman
(74) *Attorney, Agent, or Firm* — Renner, Otto, Boisselle & Sklar, LLP

(57) ABSTRACT

When a granular object is determined to have to be sorted out two or more times in two or more of sort-out necessity/unnecessity determination results determined by a determination portion, a sort-out signal setting portion of an optical sorting apparatus sets a sort-out actuation signal that contains information for actuating an ejector when the granular object advancing in the air passes through a sorting region based on a combination of the sort-out necessity/unnecessity determination results from a predetermined signal setting table.

7 Claims, 9 Drawing Sheets

(56) References Cited

FOREIGN PATENT DOCUMENTS

| | | |
|---|---|---|
| JP | 2007-283204 A | 11/2007 |
| JP | 2017-164722 A | 9/2017 |
| JP | 2017-164723 A | 9/2017 |

OTHER PUBLICATIONS

Written Opinion corresponding to International Application No. PCT/JP2021/045937 mailed Feb. 8, 2022, Japanese only.
Japanese Office Action in corresponding Japanese Patent Application 2020-216333 mailed Aug. 13, 2021, including English Translation.
Extended European Search Report for corresponding Application No. 21 910 455.1, issued May 3, 2024.
International Preliminary Report on Patentability for corresponding Application No. PCT/JP2021/045937, issued Jul. 6, 2023.

\* cited by examiner

FIG. 4A

- EXAMPLE 1 OF SIGNAL SETTING TABLE (PRIORITIZE DETERMINATION RESULT BASED ON VISIBLE LIGHT RAY DATA (WAVELENGTH A))

| | | DETERMINATION RESULT (SORT-OUT IS NECESSARY: ○, SORT-OUT IS UNNECESSARY: ×) | | | |
|---|---|---|---|---|---|
| | | SORT-OUT NECESSARY IN BOTH | SORT-OUT NECESSARY IN ONLY ONE OF THEM | | SORT-OUT UNNECESSARY IN BOTH |
| SORT-OUT NECESSITY/UNNECESSITY DETERMINATION INFORMATION | VISIBLE LIGHT RAY DATA (WAVELENGTH A) | ○ | ○ | × | × |
| | VISIBLE LIGHT RAY DATA (WAVELENGTH B) | ○ | × | ○ | × |
| SETTING OF SORT-OUT ACTUATION SIGNAL X | | PRESET SIGNAL A | PRESET SIGNAL A | PRESET SIGNAL B | — |

- EXAMPLE 2 OF SIGNAL SETTING TABLE (PRIORITIZE DETERMINATION RESULT BASED ON VISIBLE LIGHT RAY DATA (WAVELENGTH B))

| | | DETERMINATION RESULT (SORT-OUT IS NECESSARY: ○, SORT-OUT IS UNNECESSARY: ×) | | | |
|---|---|---|---|---|---|
| | | SORT-OUT NECESSARY IN BOTH | SORT-OUT NECESSARY IN ONLY ONE OF THEM | | SORT-OUT UNNECESSARY IN BOTH |
| SORT-OUT NECESSITY/UNNECESSITY DETERMINATION INFORMATION | VISIBLE LIGHT RAY DATA (WAVELENGTH A) | ○ | ○ | × | × |
| | VISIBLE LIGHT RAY DATA (WAVELENGTH B) | ○ | × | ○ | × |
| SETTING OF SORT-OUT ACTUATION SIGNAL X | | PRESET SIGNAL B | PRESET SIGNAL B | PRESET SIGNAL A | — |

- EXAMPLE 3 OF SIGNAL SETTING TABLE (SET PRESET DEDICATED SIGNAL AS SORT-OUT ACTUATION SIGNAL WHEN DETERMINATION RESULT INDICATES THAT SORT-OUT IS NECESSARY IN BOTH VISIBLE LIGHT RAY DATA (WAVELENGTH A) AND VISIBLE LIGHT RAY DATA (WAVELENGTH B))

| | | DETERMINATION RESULT (SORT-OUT IS NECESSARY: ○, SORT-OUT IS UNNECESSARY: ×) | | | |
|---|---|---|---|---|---|
| | | SORT-OUT NECESSARY IN BOTH | SORT-OUT NECESSARY IN ONLY ONE OF THEM | | SORT-OUT UNNECESSARY IN BOTH |
| SORT-OUT NECESSITY/UNNECESSITY DETERMINATION INFORMATION | VISIBLE LIGHT RAY DATA (WAVELENGTH A) | ○ | ○ | × | × |
| | VISIBLE LIGHT RAY DATA (WAVELENGTH B) | ○ | × | ○ | × |
| SETTING OF SORT-OUT ACTUATION SIGNAL X | | PRESET SIGNAL C | PRESET SIGNAL A | PRESET SIGNAL B | — |

FIG. 4B

| | DESCRIPTION OF SIGNAL CONTENT |
|---|---|
| PRESET SIGNAL A | SIGNAL THAT CONTAINS INFORMATION (A DELAY TIME AND AN EJECTION TIME) ACCORDING TO WHICH THE GRANULAR OBJECT CAN BE SORTED OUT BY AN EJECTION OPERATION OF THE EJECTOR IN THE SORTING REGION WHEN THE GRANULAR OBJECT IS DETERMINED TO HAVE TO BE SORTED OUT BASED ON THE VISIBLE LIGHT RAY DATA (WAVELENGTH A) ACQUIRED IN THE INSPECTION REGION |
| PRESET SIGNAL B | SIGNAL THAT CONTAINS INFORMATION (A DELAY TIME AND AN EJECTION TIME) ACCORDING TO WHICH THE GRANULAR OBJECT CAN BE SORTED OUT BY AN EJECTION OPERATION OF THE EJECTOR IN THE SORTING REGION WHEN THE GRANULAR OBJECT IS DETERMINED TO HAVE TO BE SORTED OUT BASED ON THE VISIBLE LIGHT RAY DATA (WAVELENGTH B) ACQUIRED IN THE INSPECTION REGION |
| PRESET SIGNAL C | SIGNAL THAT IS EXCLUSIVELY USED WHEN THE GRANULAR OBJECT IS DETERMINED TO HAVE TO BE SORTED OUT IN EACH OF THE VISIBLE LIGHT RAY DATA (WAVELENGTH A) AND THE VISIBLE LIGHT RAY DATA (WAVELENGTH B) ACQUIRED IN THE INSPECTION REGION, AND CONTAINS PRESET INFORMATION (A DELAY TIME AND AN EJECTION TIME) FOR SORTING OUT THE GRANULAR OBJECT BY AN EJECTION OPERATION OF THE EJECTOR IN THE SORTING REGION |

FIG. 5A

- EXAMPLE 4 OF SIGNAL SETTING TABLE (PRIORITIZE DETERMINATION RESULT IN DESCENDING ORDER OF VISIBLE LIGHT RAY DATA, NEAR-INFRARED RAY DATA, AND X-RAY DATA)

| | DETERMINATION RESULT (SORT-OUT IS NECESSARY: ○, SORT-OUT IS UNNECESSARY: ×) | | | | | |
|---|---|---|---|---|---|---|
| | SORT-OUT NECESSARY IN ALL | SORT-OUT NECESSARY IN TWO OF THEM | | | SORT-OUT NECESSARY IN ONE OF THEM | SORT-OUT UNNECESSARY IN ALL |
| SORT-OUT NECESSITY/UNNECESSITY DETERMINATION INFORMATION | VISIBLE LIGHT RAY DATA | ○ | ○ | ○ | × | × | × |
| | NEAR-INFRARED RAY DATA | ○ | ○ | × | × | ○ | ○ | × | × |
| | X-RAY DATA | ○ | × | ○ | ○ | × | ○ | × | - |
| SETTING OF SORT-OUT ACTUATION SIGNAL X | | PRESET SIGNAL a | PRESET SIGNAL a | PRESET SIGNAL b | PRESET SIGNAL a | PRESET SIGNAL a | PRESET SIGNAL b | PRESET SIGNAL c | - |

- EXAMPLE 5 OF SIGNAL SETTING TABLE (SET PRESET DEDICATED SIGNAL AS SORT-OUT ACTUATION SIGNAL WHEN SORT-OUT IS DETERMINED TO BE NECESSARY IN ALL OR TWO OF VISIBLE LIGHT RAY DATA, NEAR-INFRARED RAY DATA, AND X-RAY DATA)

| | DETERMINATION RESULT (SORT-OUT IS NECESSARY: ○, SORT-OUT IS UNNECESSARY: ×) | | | | | |
|---|---|---|---|---|---|---|
| | SORT-OUT NECESSARY IN ALL | SORT-OUT NECESSARY IN TWO OF THEM | | | SORT-OUT NECESSARY IN ONE OF THEM | SORT-OUT UNNECESSARY IN ALL |
| SORT-OUT NECESSITY/UNNECESSITY DETERMINATION INFORMATION | VISIBLE LIGHT RAY DATA | ○ | ○ | ○ | × | × | × |
| | NEAR-INFRARED RAY DATA | ○ | ○ | × | × | ○ | ○ | × | × |
| | X-RAY DATA | ○ | × | ○ | ○ | × | ○ | × | - |
| SETTING OF SORT-OUT ACTUATION SIGNAL X | | PRESET SIGNAL g | PRESET SIGNAL d | PRESET SIGNAL e | PRESET SIGNAL f | PRESET SIGNAL a | PRESET SIGNAL b | PRESET SIGNAL c | - |

FIG. 5B

| | DESCRIPTION OF SIGNAL CONTENT |
|---|---|
| PRESET SIGNAL a | SIGNAL THAT CONTAINS INFORMATION (A DELAY TIME AND AN EJECTION TIME) ACCORDING TO WHICH THE GRANULAR OBJECT CAN BE SORTED OUT BY AN EJECTION OPERATION OF THE EJECTOR IN THE SORTING REGION WHEN THE GRANULAR OBJECT IS DETERMINED TO HAVE TO BE SORTED OUT BASED ON THE VISIBLE LIGHT RAY DATA ACQUIRED IN THE INSPECTION REGION |
| PRESET SIGNAL b | SIGNAL THAT CONTAINS INFORMATION (A DELAY TIME AND AN EJECTION TIME) ACCORDING TO WHICH THE GRANULAR OBJECT CAN BE SORTED OUT BY AN EJECTION OPERATION OF THE EJECTOR IN THE SORTING REGION WHEN THE GRANULAR OBJECT IS DETERMINED TO HAVE TO BE SORTED OUT BASED ON THE NEAR-INFRARED RAY DATA ACQUIRED IN THE INSPECTION REGION |
| PRESET SIGNAL c | SIGNAL THAT CONTAINS INFORMATION (A DELAY TIME AND AN EJECTION TIME) ACCORDING TO WHICH THE GRANULAR OBJECT CAN BE SORTED OUT BY AN EJECTION OPERATION OF THE EJECTOR IN THE SORTING REGION WHEN THE GRANULAR OBJECT IS DETERMINED TO HAVE TO BE SORTED OUT BASED ON THE X-RAY DATA ACQUIRED IN THE INSPECTION REGION |
| PRESET SIGNAL d | SIGNAL THAT IS EXCLUSIVELY USED WHEN THE GRANULAR OBJECT IS DETERMINED TO HAVE TO BE SORTED OUT IN EACH OF THE DETERMINATIONS BASED ON THE VISIBLE LIGHT RAY DATA AND THE NEAR-INFRARED RAY DATA ACQUIRED IN THE INSPECTION REGION, AND CONTAINS PRESET INFORMATION (A DELAY TIME AND AN EJECTION TIME) FOR SORTING OUT THE GRANULAR OBJECT BY AN EJECTION OPERATION OF THE EJECTOR IN THE SORTING REGION |
| PRESET SIGNAL e | SIGNAL THAT IS EXCLUSIVELY USED WHEN THE GRANULAR OBJECT IS DETERMINED TO HAVE TO BE SORTED OUT IN EAC OF THE DETERMINATIONS BASED ON THE NEAR-INFRARED RAY DATA AND THE X-RAY DATA ACQUIRED IN THE INSPECTION REGION, AND CONTAINS PRESET INFORMATION (A DELAY TIME AND AN EJECTION TIME) FOR SORTING OUT THE GRANULAR OBJECT BY AN EJECTION OPERATION OF THE EJECTOR IN THE SORTING REGION |
| PRESET SIGNAL f | SIGNAL THAT IS EXCLUSIVELY USED WHEN THE GRANULAR OBJECT IS DETERMINED TO HAVE TO BE SORTED OUT IN EACH OF THE DETERMINATIONS BASED ON THE VISIBLE LIGHT RAY DATA AND THE X-RAY DATA ACQUIRED IN THE INSPECTION REGION, AND CONTAINS PRESET INFORMATION (A DELAY TIME AND AN EJECTION TIME) FOR SORTING OUT THE GRANULAR OBJECT BY AN EJECTION OPERATION OF THE EJECTOR IN THE SORTING REGION |
| PRESET SIGNAL g | SIGNAL THAT IS EXCLUSIVELY USED WHEN THE GRANULAR OBJECT IS DETERMINED TO HAVE TO BE SORTED OUT IN EACH OF THE DETERMINATIONS BASED ON THE VISIBLE LIGHT RAY DATA, THE NEAR-INFRARED RAY DATA, AND THE X-RAY DATA ACQUIRED IN THE INSPECTION REGION, AND CONTAINS PRESET INFORMATION (A DELAY TIME AND AN EJECTION TIME) FOR SORTING OUT THE GRANULAR OBJECT BY AN EJECTION OPERATION OF THE EJECTOR IN THE SORTING REGION |

SORTING APPARATUS

This application is a national phase of International Application No. PCT/JP2021/045937 filed Dec. 14, 2021, which claims the priority of Japanese Patent Application JP 2020-216333 filed Dec. 25, 2020, both of which are hereby incorporated herein by reference in their entireties.

TECHNICAL FIELD

The present invention relates to a sorting apparatus that sorts a sorting target by determining whether the sorting target has to be sorted out based on imaging data using, for example, a visible light ray and/or an X-ray.

BACKGROUND

Conventionally, there have been generally known sorters that, with an aim to prevent a foreign object such as a stone and glass or a defective product such as a colored grain from being mixed in when a large number of granular objects such as rice or wheat are packed, optically identifies and sorts out these foreign object and defective product. For example, a sorter disclosed in PTL 1 includes a conveyance chute, which conveys each granular object by causing it to sequentially flow obliquely downward, and a discharge chute, which is disposed at a predetermined interval below the conveyance chute. In the discharge chute, an acceptable product discharge portion, which guides discharge of a granular object that is an acceptable product, and a defective product discharge portion, which guides discharge of a granular object that is a defective product, are arranged in parallel in a front-rear direction of the apparatus. Below the conveyance chute, a first CCD camera and a second CCD camera for visible light are arranged on an upper surface side and a lower surface side of the conveyance chute opposite from each other across an inspection region set between these conveyance chute and discharge chute, respectively. The first and second CCD cameras are configured to image the granular object falling from the lower end of the conveyance chute and passing through the inspection region, from the upper surface side and the lower surface side thereof, respectively. An NIR camera for near-infrared light is disposed on the upper surface side of the conveyance chute and the apparatus downstream side of the first CCD camera, and is configured to image, from the upper surface side, the granular object passing through the inspection region. Further, an ejector including an ejection nozzle is disposed on the lower surface side of the conveyance chute and the apparatus downstream side of the second CCD camera, and the ejector is configured to be able to eject compressed air to an obliquely upper position on the apparatus front side toward a sorting region located on the downstream side of the inspection region. A controller is connected to the first and second CCD cameras, the NIR camera, and the ejector, and the controller is configured to determine whether each granular object has to be sorted out based on the imaging data acquired by each of the first CCD camera, the second CCD camera, and the NIR camera, and output a sort-out actuation signal to the ejector to cause the ejector to eject the compressed air from the ejection nozzle toward the granular object located in the sorting region, thereby changing the falling direction of the granular object falling toward the acceptable product discharge portion to the defective product discharge portion side to thus sort out the granular object, if determining that the granular object has to be sorted out.

CITATION LIST

[PTL 1] Japanese Patent Application Laid-Open No. 2007-283204

SUMMARY

In the sorting apparatus configured in the above-described manner, the granular object freely falls in the inspection region by each of the cameras and the sorting region by the ejector, and therefore granular objects different in weight or volume take respective different times to reach the sorting region from the inspection region. Therefore, a sort-out actuation signal that contains information for actuating the ejector, such as a delay time taken until the compressed air is ejected from the ejector toward the granular object after each of the cameras images the granular object in the inspection region, and an ejection time for which the compressed air is kept ejected from the ejector, is associated with one of pieces of sort-out necessity/unnecessity determination information such as visible light ray data and near-infrared ray data for each type of foreign object or defective product, and stored in the controller in advance. The controller is configured to, if determining that the granular object has to be sorted out based on the sort-out necessity/unnecessity determination information acquired from the camera, actuate the ejector using the sort-out actuation signal corresponding to this foreign object or defective product to sort out the foreign object or the defective product located in the sorting region.

However, the above-described control raises the following problem. In a case where one granular object that is a foreign object or a defective product is such a product that the sort-out thereof is individually determined to be necessary for each of a plurality of pieces of sort-out necessity/unnecessity determination information, the ejector is actuated even in response to the sort-out actuation signal associated with each of pieces of sort-out necessity/unnecessity determination information not used to sort out this granular object other than the sort-out necessity/unnecessity determination information used to sort out this granular object. Therefore, another granular object that is an acceptable product passing through the sorting region at a timing when the ejector is actuated is unintentionally sorted out due to the ejection by the ejector, as a result of which the yield ends up being impaired.

The present invention has been contrived in consideration of these circumstances, and an object thereof is to provide a sorting apparatus capable of accurately sorting out a foreign object or a defective product from a large number of granular objects.

To achieve the above-described object, the present invention is characterized in that a signal for actuating a sorting portion is set in a well-devised manner when two or more sort-out necessity/unnecessity determination results are respectively output based on two or more pieces of sort-out necessity/unnecessity determination information for one sorting target.

More specifically, the present invention is directed to a sorting apparatus configured to sort a sorting target advancing in the air by one or more sorting portions, and devises the following measures.

That is, according to a first aspect of the invention, a sorting apparatus includes at least one imaging portion configured to acquire one or more pieces of sort-out necessity/unnecessity determination information by imaging the sorting target, a determination portion configured to determine whether the sorting target has to be sorted out based on the sort-out necessity/unnecessity determination information and output a sort-out necessity/unnecessity determination result, which is a result of the determination, and a sort-out signal setting portion configured to, when the one sorting target is determined to have to be sorted out two or more times in two or more of the sort-out necessity/unnecessity determination results determined by the determination portion, set a sort-out actuation signal that contains information for actuating the sorting portion when the sorting target passes through a sorting region based on a combination of the sort-out necessity/unnecessity determination results from a predetermined signal setting table or calculate and set the sort-out actuation signal using a predetermined signal calculation algorithm based on the combination of the sort-out necessity/unnecessity determination results.

According to a second aspect of the invention, in the first aspect of the invention, a preset signal containing the information for actuating the sorting portion is stored in the signal setting table in advance for each of the pieces of sort-out necessity/unnecessity determination information. The sort-out signal setting portion is configured to, when the sorting target is determined to have to be sorted out in only one of the sort-out necessity/unnecessity determination results determined by the determination portion, set, as the sort-out actuation signal, the preset signal corresponding to the sort-out necessity/unnecessity determination information based on which the sorting target is determined to have to be sorted out, and is further configured to, when the sorting target is determined to have to be sorted out two or more times in two or more of the sort-out necessity/unnecessity determination results determined by the determination portion, set, as the sort-out actuation signal, one of the respective preset signals corresponding to the pieces of sort-out necessity/unnecessity determination information based on which the sorting target is determined to have to be sorted out.

According to a third aspect of the invention, in the second aspect of the invention, the imaging portion includes a first imaging portion configured to acquire visible light ray data as the sort-out necessity/unnecessity determination information by imaging the sorting target using visible light ray, and a second imaging portion configured to acquire near-infrared ray data as the sort-out necessity/unnecessity determination information by imaging the sorting target using near-infrared ray. The sort-out signal setting portion is further configured to set, as the sort-out actuation signal, any one of the respective preset signals corresponding to the visible light ray data and the near-infrared ray data when the sorting target is determined to have to be sorted out in each of the sort-out necessity/unnecessity determination results based on the visible light ray data and the near-infrared ray data.

According to a fourth aspect of the invention, in the second aspect of the invention, the imaging portion includes a first imaging portion configured to acquire visible light ray data as the sort-out necessity/unnecessity determination information by imaging the sorting target using visible light ray, a second imaging portion configured to acquire near-infrared ray data as the sort-out necessity/unnecessity determination information by imaging the sorting target using near-infrared ray, and a third imaging portion configured to acquire X-ray data as the sort-out necessity/unnecessity determination information by imaging the sorting target using X-ray. The sort-out signal setting portion is further configured to, when the sorting target is determined to have to be sorted out in each of at least two or more of the respective sort-out necessity/unnecessity determination results based on the visible light ray data, the near-infrared ray data, and the X-ray data, set, as the sort-out actuation signal, one signal out of the preset signals respectively corresponding to the sort-out necessity/unnecessity determination results in which the sorting target is determined to have to be sorted out.

According to a fifth aspect of the invention, in any one of the second to fourth aspects of the invention, the sorting portion is an air ejection portion configured to eject compressed air from an ejection nozzle toward the sorting target. The preset signal contains information indicating a delay time taken until the sort-out actuation signal is output to the sorting portion after the imaging portion images the sorting target, and an ejection time for which the sort-out actuation signal is kept output to the sorting portion.

The first aspect of the invention allows the sorting apparatus to actuate the sorting portion only at a timing when the sorting target passes through the sorting region even when this sorting target is determined to have to be sorted out two or more times in two or more pieces of sort-out necessity/unnecessity determination information, and allows the sorting apparatus to prevent the sorting portion from being actuated at a timing other than that. Therefore, the first aspect of the invention can achieve a sorting apparatus capable of accurately sorting out a foreign object and/or a defective product from a large number of granular objects.

The second aspect of the invention allows the sorting apparatus to select the optimal sort-out actuation signal for sorting out the sorting target in the sorting region regardless of the number of pieces of sort-out necessity/unnecessity determination information acquired from the sorting target and thus allows the sorting apparatus to reliably sort out only a granular object that is a foreign object or a defective product in the sorting region, thereby being able to realize a sorting apparatus having high sorting accuracy, which can be prevented from unintentionally sorting out a granular object that is an acceptable product.

According to the third aspect of the invention, when sorting out a sorting target G1 that reacts only to the visible light ray or the near-infrared ray and a sorting target G2 that reacts to both the visible light ray and the near-infrared ray from a large number of granular objects, the sorting apparatus can be prevented from unintentionally sorting out a granular object that is an acceptable product by the sorting portion in the sorting region when attempting to sort out the sorting target G2. Therefore, the sorting accuracy can be enhanced when the sorting target is sorted using both the visible light ray and the near-infrared ray.

According to the fourth aspect of the invention, when sorting out a sorting target G3 that reacts to any one of the visible light ray, the near-infrared ray, and the X-ray, and a sorting target G4 that reacts to at least two of the visible light ray, the near-infrared ray, and the X-ray from a large number of granular objects, the sorting apparatus can be prevented from unintentionally sorting out a granular object that is an acceptable product by the sorting portion in the sorting region when attempting to sort out the sorting target G4. Therefore, the fourth aspect of the invention can realize a sorting apparatus workable with high sorting accuracy when sorting the sorting target using the three pieces of sort-out necessity/unnecessity determination information using the visible light ray, the near-infrared ray, and the X-ray.

According to the fifth aspect of the invention, the sort-out work is performed by changing the falling direction of the sorting target with the aid of a wind pressure due to the compressed air when the sorting target supposed to be sorted out passes through the sorting region, and therefore the sorting target can be sorted efficiently with a simple and low-cost structure.

BRIEF DESCRIPTION OF THE DRAWINGS

FIG. 4A illustrates examples of a signal setting table in a case where two pieces of sort-out necessity/unnecessity determination information are acquired with respect to one granular object.

FIG. 4B illustrates the content of each of signals illustrated in FIG. 4A.

FIG. 5A illustrates examples of the signal setting table in a case where three pieces of sort-out necessity/unnecessity determination information are acquired with respect to one granular object.

FIG. 5B illustrates the content of each of signals illustrated in FIG. 5A.

DETAILED DESCRIPTION OF THE EMBODIMENTS

In the following description, embodiments of the present invention will be described in detail with reference to the drawings. The following descriptions of preferred embodiments are essentially presented as mere examples.

Figure 1:
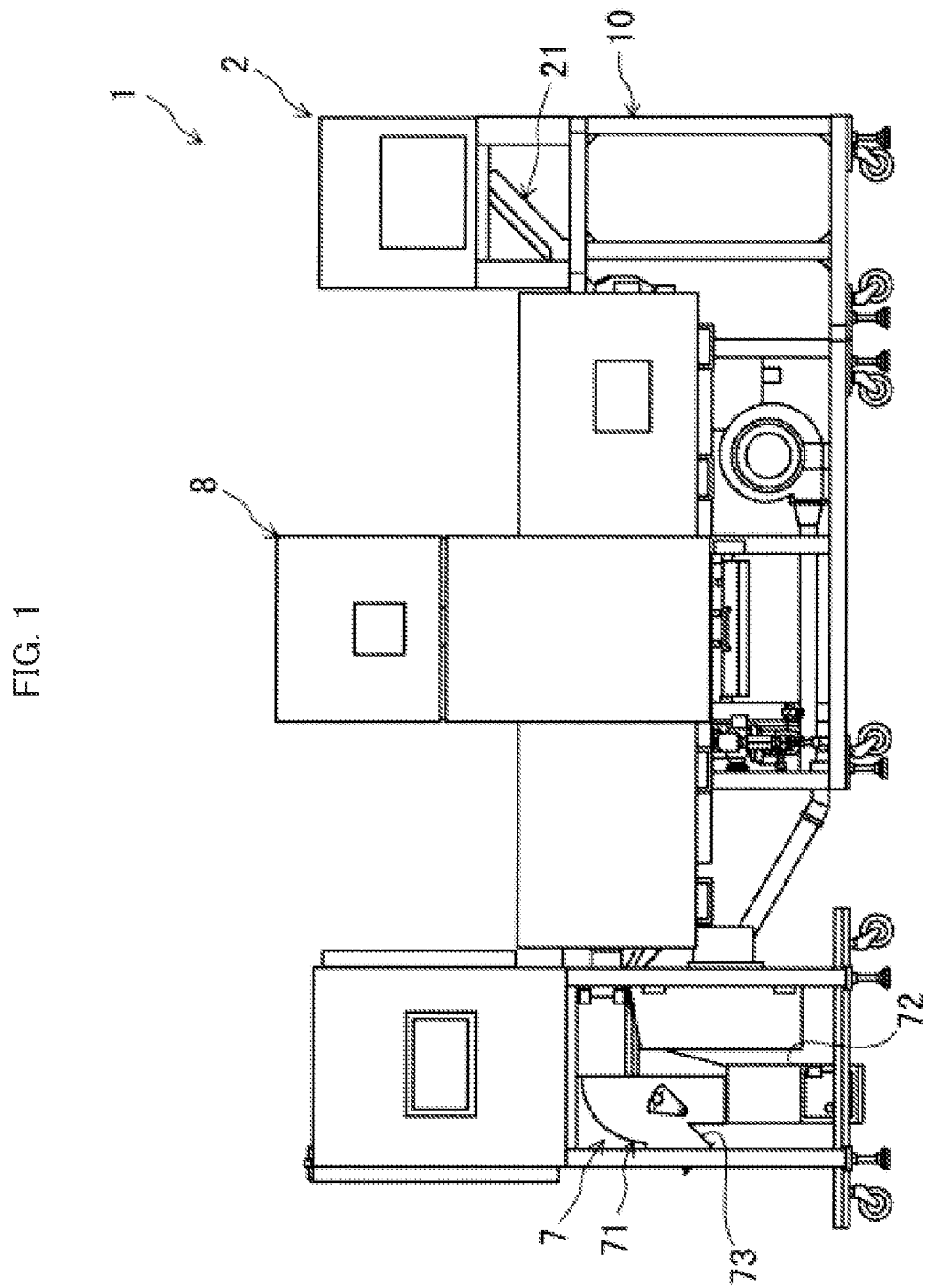
FIG. 1 is front view of a sorting apparatus according to a first embodiment of the present invention.

<<First Embodiment of the Invention>> FIG. 1 illustrates an optical sorting apparatus 1 according to a first embodiment of the present invention. The optical sorting apparatus 1 is configured to sort and extract acceptable products and defective products after inspecting the conditions and/or the kinds of a large number of granular objects G (sorting targets), which are foods such as almonds or beans, plastic pieces, or the like, to determine whether they are acceptable or defective while conveying them individually sequentially. The optical sorting apparatus 1 includes an apparatus frame 10 made of a plurality of metal frames.

Figure 2:
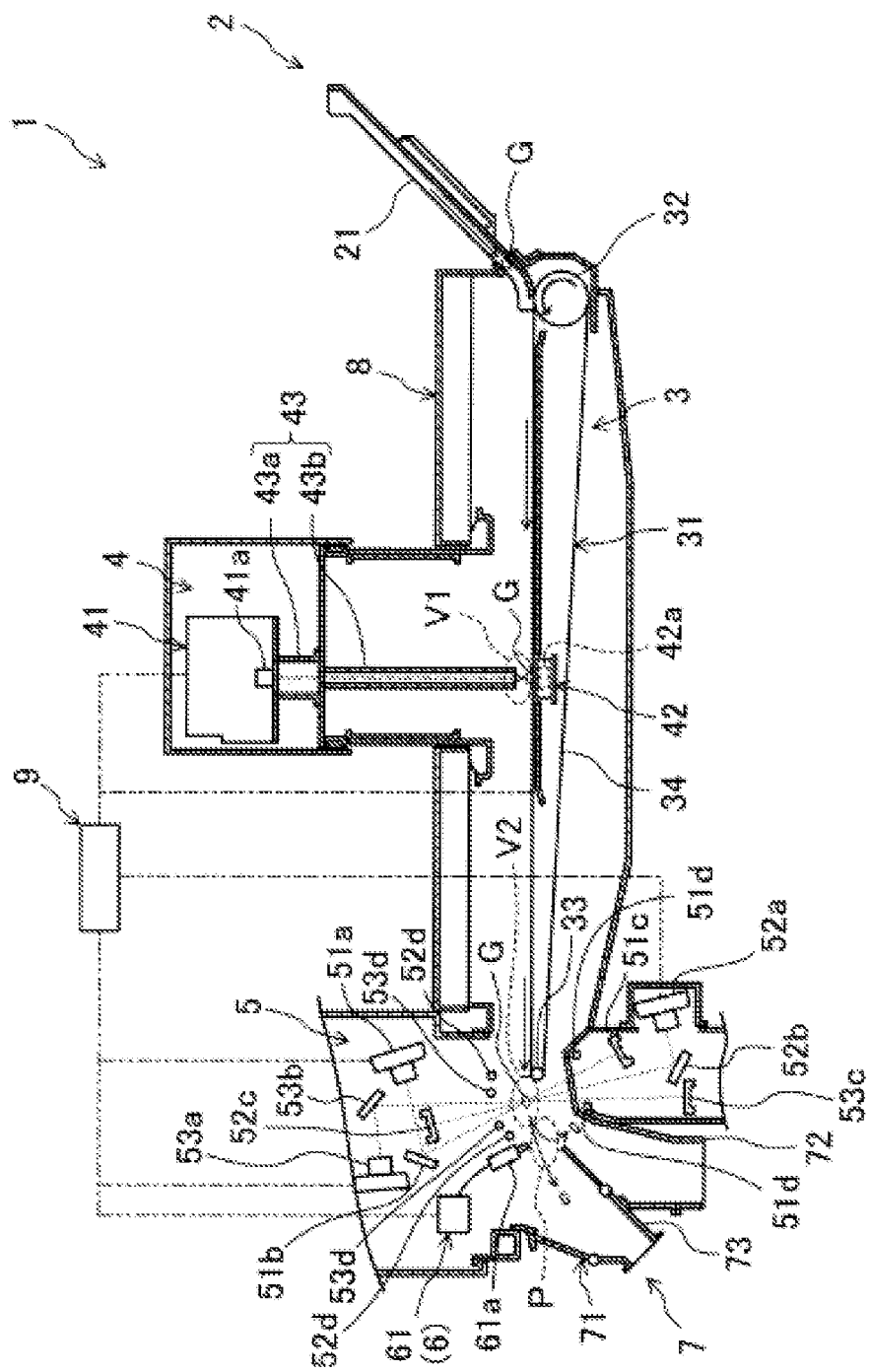
FIG. 2 is a schematic cross-sectional view of the inner structure of the sorting apparatus according to the first embodiment of the present invention.

As illustrated in FIG. 2, a loading unit 2, a conveyance unit 3, a first inspection unit 4, a second inspection unit 5, a sorting unit 6 (a sorting portion), and an unloading unit 7 are mounted on the apparatus frame 10 in this order starting from the apparatus upstream side. The conveyance unit 3, the first and second inspection units 4 and 5, and the sorting unit 6 are covered with a shielding cover 8. Further, a controller 9 is connected to the loading unit 2, the conveyance unit 3, the first and second inspection units 4 and 5, the sorting unit 6, and the unloading unit 7.

The loading unit 2 is configured in such a manner that the large number of granular objects G introduced from a vibration feeder (not illustrated) are loaded onto the conveyance unit 3 via a loading slider 21, and the granular objects G are sequentially loaded to positions at equal intervals in the width direction of the conveyance unit 3, respectively.

The conveyance unit 3 includes a belt conveyor 31 extending horizontally from the lower end of the loading slider 21 to the apparatus downstream side.

The belt conveyor 31 includes a driving roller 32 located under the lower end of the loading slider 21, and a driven roller 33 located on the apparatus downstream side and having a roller diameter smaller than the driving roller 32. A resin endless belt 34 is wound on the driving roller 32 and the driven roller 33.

The endless belt 34 is configured to sequentially convey each of the granular objects G placed on the outer circumferential surface thereof by circling around with the aid of rotational operations of the driving roller 32 and the driven roller 33.

After passing through a first inspection region V1 set at an intermediate portion of the endless belt 34, each of the conveyed granular objects G is guided so as to sequentially fall from the downstream end in the conveyance direction obliquely downward and sequentially pass through a second inspection region V2 and a sorting region P set in the air between the belt conveyor 31 and the unloading unit 7.

The first inspection unit 4 is configured to image the outer shape or the inner condition of the granular object G, and includes an X-ray irradiation unit 41 located above the first inspection region V1 at a predetermined interval and an X-ray detector 42 (a third imaging portion) installed below the first inspection region V1.

The X-ray irradiation unit 41 includes an X-ray emission unit 41a that emits an X-ray straight down, and is configured in such a manner that the granular object G conveyed by the endless belt 34 and passing through the first inspection region V1 is irradiated with the X-ray emitted from this X-ray emission unit 41a.

The X-ray detector 42 includes a line sensor 42a arranged in one row in the width direction of the belt conveyor 31 and capable of detecting the X-ray, and is configured to acquire X-ray data D1 (sort-out necessity/unnecessity determination information) acquired by imaging the shape or the inner condition (a transmitted amount) of the granular object G based on the X-ray detected by the line sensor 42a.

A shielding tubular member 43, which has a vertically extending tube centerline, is disposed between the X-ray emission unit 41a and the first inspection region V1.

The shielding tubular member 43 includes a first tubular member 43a disposed continuously from the X-ray emission unit 41a, and a second tubular member 43b disposed continuously from the lower portion of the first tubular member 43a. The opening of the first tubular member 43a at the upper end thereof corresponds to the X-ray emission unit 41a. The opening of the second tubular member 43b at the lower end thereof is located near the first inspection region V1.

The second inspection unit 5 includes a first CCD camera 51a for visible light (a first imaging portion), a second CCD camera 52a for visible light (the first imaging portion), and an NIR camera 53a for near-infrared light (a second imaging portion). The first CCD camera 51a is disposed at a position above the downstream end of the belt conveyor 31. The second CCD camera 52a is disposed at a position below and close to the downstream end of the belt conveyor 31. The NIR camera 53a is disposed at a predetermined interval on the apparatus downstream side of the first CCD camera 51a.

A first mirror 51b is arranged obliquely below the first CCD camera 51a on the apparatus downstream side in an orientation of being inclined with respect to an imaging direction of the first CCD camera 51a. On the other hand, a first background board 51c is arranged at a position obliquely above the second CCD camera 52a on the apparatus downstream side. The second inspection region V2 is located between the first mirror 51b and the first background board 51c.

A pair of first visible light sources 51d is disposed above the first background board 51c, and the first CCD camera 51a is configured to acquire visible light ray data D2 (sort-out necessity/unnecessity determination information) by capturing an image of the granular object G reflected on the first mirror 51b when the granular object G passes through the second inspection region V2, from the upper surface side thereof.

In other words, the first CCD camera 51a is configured to acquire the visible light ray data D2 as the sort-out necessity/unnecessity determination information by imaging the granular object G using the visible light ray.

A second mirror 52b is arranged on the apparatus downstream side of the second CCD camera 52a in an orientation of being inclined with respect to an imaging direction of the second CCD camera 52a. On the other hand, a second background board 52c is arranged at a position obliquely below the first mirror 51b on the apparatus upstream side. The second inspection region V2 is located between the second mirror 52b and the second background board 52c.

A pair of second visible light sources 52d is disposed below the second background board 52c, and the second CCD camera 52a is configured to acquire visible light ray data D3 (sort-out necessity/unnecessity determination information) by capturing an image of the granular object G reflected on the second mirror 52b when the granular object G passes through the second inspection region V2, from the lower surface side thereof.

In other words, the second CCD camera 52a is configured to acquire the visible light ray data D3 as the sort-out necessity/unnecessity determination information by imaging the granular object G using the visible light ray.

A third mirror 53b is arranged obliquely above the NIR camera 53a on the apparatus upstream side in an orientation of being inclined with respect to an imaging direction of the NIR camera 53a. On the other hand, a third background board 53c is arranged at a position on the apparatus downstream side of the second mirror 52b. The second inspection region V2 is located between the third mirror 53b and the third background board 53c.

A pair of near-infrared light sources 53d is disposed between the pair of second visible light sources 52d, and the NIR camera 53a is configured to acquire near-infrared ray data D4 (sort-out necessity/unnecessity determination information) by capturing an image of the granular object G reflected on the third mirror 53b when the granular object G passes through the second inspection region V2.

In other words, the NIR camera 53a is configured to acquire the near-infrared ray data D4 as the sort-out necessity/unnecessity determination information by imaging the granular object G using the near-infrared ray.

The sorting unit 6 includes an ejector 61 (an air ejection portion) located below the NIR camera 53a.

The ejector 61 includes an ejection nozzle 61a. A port of the ejection nozzle 61a for ejecting compressed air faces toward an obliquely lower position on the apparatus upstream side. This ejection nozzle 61a is configured to be able to eject the compressed air toward the sorting region P located on the apparatus downstream side of the second inspection region V2.

The unloading unit 7 includes a discharge chute 71 having a generally V-shape with an opening side thereof facing toward an obliquely lower position on the apparatus downstream side in a front view, and having a shape elongated in the width direction of the belt conveyor 31.

The discharge chute 71 includes a defective product discharge portion 72, which guides discharge of the granular object G that is a defective product downward, and an acceptable product discharge portion 73, which guides discharge of the granular object G that is an acceptable product toward an obliquely lower position on the apparatus downstream side. The acceptable product discharge portion 73 is provided continuously from the upper portion of the defective product discharge portion 72 on the apparatus downstream side.

The controller 9 is configured to actuate the belt conveyor 31 by outputting a conveyance actuation signal, and actuate the ejector 61 by outputting a sort-out actuation signal X.

Figure 3:
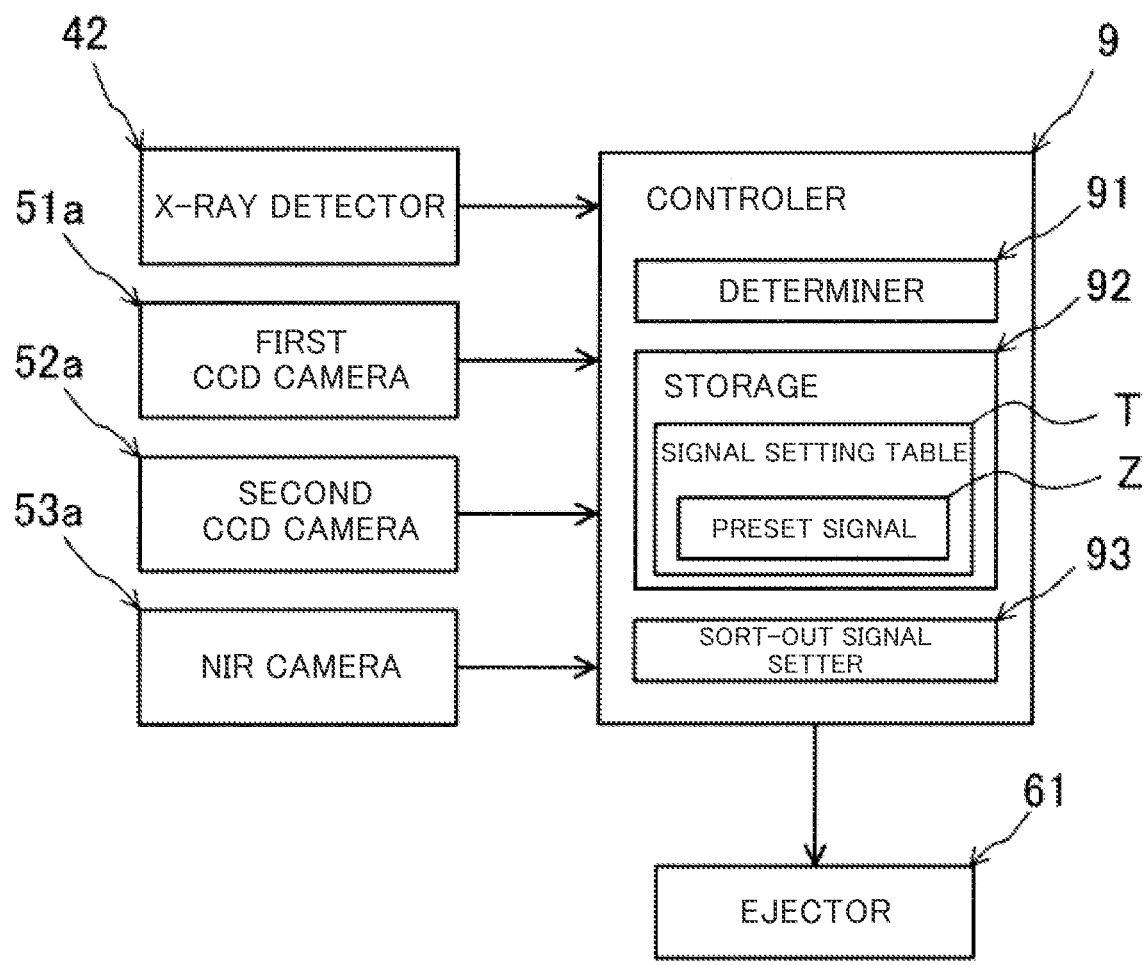
FIG. 3 is a block diagram illustrating the relationship between a controller, imaging devices, and an ejector.

As illustrated in FIG. 3, the controller 9 includes a determiner 91 (a determiner portion), which determines whether the granular object G has to be sorted out based on the X-ray data D1, the visible light ray data D2, the visible light ray data D3, and the near-infrared ray data D4. The determiner 91 is configured to output a sort-out necessity/unnecessity determination result R, which is a result of the determination.

More specifically, the determiner 91 is configured to output a sort-out necessity/unnecessity determination result R1 based on the X-ray data D1, output a sort-out necessity/unnecessity determination result R2 based on the visible light ray data D2, output a sort-out necessity/unnecessity determination result R3 based on the visible light ray data D3, and output a sort-out necessity/unnecessity determination result R4 based on the near-infrared ray data D4.

Further, the controller 9 includes a storage 92 capable of storing various kinds of data therein, and a signal setting table T for setting the sort-out actuation signal X is provided in the storage 92.

A preset signal Z, which contains information I for actuating the ejector 61 when the granular object G supposed to be sorted out passes through the sorting region P, is stored in the signal setting table T in advance. This preset signal Z is set to each of the X-ray data D1, the visible light ray data D2, the visible light ray data D3, and the near-infrared ray data D4.

The preset signal Z contains the information I indicating a delay time S1 taken until the sort-out actuation signal X is output to the ejector 61 after each of the X-ray detector 42, the first CCD camera 51a, the second CCD camera 52a, and the NIR camera 53a images the granular object G, and an ejection time S2 for which the sort-out actuation signal X is kept output to the ejector 61.

A preset signal Z1 corresponding to the X-ray data D1, a preset signal Z2 corresponding to the visible light ray data D2, a preset signal Z3 corresponding to the visible light ray data D3, and a preset signal Z4 corresponding to the near-infrared ray data D4 are stored in the signal setting table T in advance, and the information about the delay time S1 and the ejection time S2 is stored for each of the preset signals Z1 to Z4.

The preset signal Z1 contains the information I (the delay time S1 and the ejection time S2) according to which the granular object G can be sorted out by an ejection operation of the ejector 61 in the sorting region P when the granular object G is determined to have to be sorted out based on the X-ray data D1 acquired in the first inspection region V1.

The preset signals Z2 to Z4 each contain the information I (the delay time S1 and the ejection time S2) according to which the granular object G can be sorted out by an ejection operation of the ejector 61 in the sorting region P when the granular object G is determined to have to be sorted out based on the visible light ray data D2, the visible light ray data D3, or the near-infrared ray data D4 acquired in the second inspection region V2.

The signal setting table T may store therein the preset signal Z that contains dedicated information I corresponding to each combination in a case where the granular object G is determined to have to be sorted out tow or more times in two or more determinations based on the X-ray data D1, the visible light ray data D2, the visible light ray data D3, and the near-infrared ray data D4. For example, the signal setting table T may store therein the dedicated information I (the delay time S1 and the ejection time S2) according to which the granular object G can be sorted out by an ejection operation of the ejector 61 in the sorting region P when the granular object G is determined to have to be sorted out in each of the determinations based on the X-ray data D1 and the visible light ray data D2, as a preset signal Z5.

Further, the signal setting table T stores therein relationships between combinations of the sort-out necessity/unnecessity determination results R determined by the determiner 91 and the sort-out actuation signals X respectively associated with these combinations.

Further, the controller 9 includes a sort-out signal setter 93 (a sort-out signal setting portion), which sets the sort-out actuation signal X based on the combination of the sort-out necessity/unnecessity determination results R from the signal setting table T.

The sort-out signal setter 93 is configured to, if one granular object G is determined to have to be sorted out only once in the sort-out necessity/unnecessity determination results R determined by the determiner 91, set the sort-out actuation signal X according to the preset signal Z corresponding to this sort-out necessity/unnecessity determination result in which the granular object G is determined to have to be sorted out.

For example, the sort-out signal setter 93 is configured to set the preset signal Z1 corresponding to the sort-out necessity/unnecessity determination result R1 as the sort-out actuation signal X if the granular object G is determined to have to be sorted out in only the sort-out necessity/unnecessity determination result R1.

On the other hand, the sort-out signal setter 93 is configured to, if one granular object G is determined to have to be sorted out two or more times in two or more of the sort-out necessity/unnecessity determination results R determined by the determiner 91, set the sort-out actuation signal X based on the combination of the sort-out necessity/unnecessity determination results R from the signal setting table T.

For example, the sort-out signal setter 93 is configured to set the preset signal Z1 corresponding to the sort-out necessity/unnecessity determination result R1 as the sort-out actuation signal X if the granular object G is determined to have to be sorted out in each of the sort-out necessity/unnecessity determination result R1 and the sort-out necessity/unnecessity determination result R2.

Alternatively, in another example, the sort-out signal setter 93 is configured in such a manner that the priority between the sort-out necessity/unnecessity determination results R1 to R4 are predetermined and one signal is selected and set as the sort-out actuation signal X from the preset signals Z1 to Z4 respectively corresponding to the sort-out necessity/unnecessity determination results R1 to R4 in which the granular object G is determined to have to be sorted out, if the granular object G is determined to have to be sorted out at least two or more times in at least two or more of the sort-out necessity/unnecessity determination results R1 to R4.

The sort-out signal setter 93 may be configured to set a dedicated signal stored in the signal setting table T in advance as the sort-out actuation signal X if the granular object G is determined to have to be sorted out at least two or more times in at least two or more of the sort-out necessity/unnecessity determination results R1 to R4. For example, the sort-out signal setter 93 may be configured to set the above-described preset signal Z5 as the sort-out actuation signal X if the granular object G is determined to have to be sorted out in each of the results based on the X-ray data D1 and the visible light ray data D2.

Further, the controller 9 is configured to, if the determiner 91 determines that the granular object G has to be sorted out, output the sort-out actuation signal X set from the above-described signal setting table T to the ejector 61 to cause the compressed air to be ejected from the ejection nozzle 61a toward the granular object G dropped from the downstream end of the belt conveyor 31 to be placed in the sorting region P and determined to have to be sorted out, thereby changing the falling direction of this granular object G toward the defective product discharge portion 72.

FIGS. 4A, 4B, 5A, and 5B illustrate examples 1 to 5 of the signal setting table T. The example 1 is such an example that the sort-out necessity/unnecessity determination information acquired in the optical sorting apparatus 1 is two different kinds of visible light ray data (a wavelength A and a wavelength B), and, if the granular object G is determined to have to be sorted out in each of the determinations based on the two kinds of visible light ray data, the determination result based on the visible light ray data of the wavelength A is prioritized and a preset signal A corresponding to the visible light ray data of this wavelength A is set as the sort-out actuation signal X. On the other hand, the example 2 is such an example that, if the granular object G is determined to have to be sorted out in each of the determinations based on the two kinds of visible light ray data, the determination result based on the visible light ray data of the wavelength B is prioritized and a preset signal B corresponding to the visible light ray data of this wavelength B is set as the sort-out actuation signal X. Further, the example 3 is such an example that, if the granular object G is determined to have to be sorted out in each of the determinations based on the two kinds of visible light ray data, a preset signal C containing the preset dedicated information I is set as the sort-out actuation signal X.

The example 4 is an example set in the following manner. The sort-out necessity/unnecessity determination information acquired in the optical sorting apparatus 1 is three kinds of data; the visible light ray data, the near-infrared ray data, and the X-ray data. If the granular object G is determined to have to be sorted out in each of all of the determinations based on the visible light ray data, the near-infrared ray data, and the X-ray data, the determination result based on the visible light ray data is prioritized, and a preset signal "a" corresponding to this visible light ray data is set as the sort-out actuation signal X. If the granular object G is determined to have to be sorted out in each of two of the determinations based on the visible light ray data, the near-infrared ray data, and the X-ray data, the determination result is prioritized in descending order of the visible light ray data, the near-infrared ray data, and the X-ray data, and the preset signal "a" corresponding to the visible light ray data or a preset signal "b" corresponding to the near-infrared ray data is set as the sort-out actuation signal X. On the other hand, the example 5 is such an example that, if the granular object G is determined to have to be sorted out in each of all of the determinations based on the visible light ray data, the near-infrared ray data, and the X-ray data, or is determined to have to be sorted out in each of two of them, one of preset signals "d" to "g" containing the preset dedicated information I is set as the sort-out actuation signal X for each of the combinations.

Next, an operation of the controller 9 when a granular object G is sorted out in the optical sorting apparatus 1 according to the first embodiment of the present invention will be described in detail.

Figure 6:
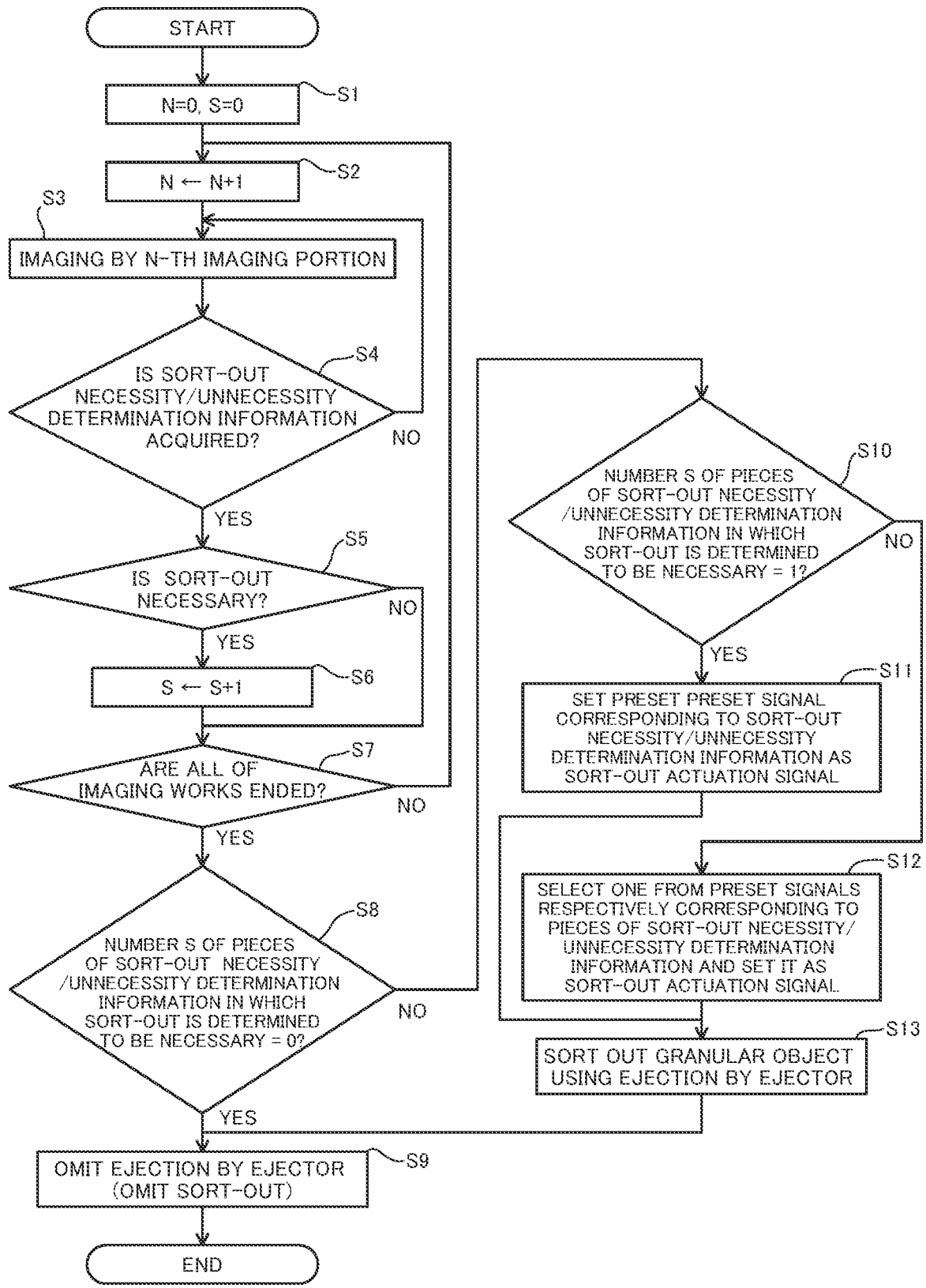
FIG. 6 is a flowchart illustrating control of sorting the granular object by the sorting apparatus according to the first embodiment of the present invention.

As illustrated in FIG. 6, first, in step S1, an imaging portion number N and the number S of pieces of sort-out necessity/unnecessity determination information are reset as N=0 and S=0. After that, the processing proceeds to step S2, in which N+1 is substituted for N. After that, the processing proceeds to step S3.

In step S3, an imaging start signal is output to an N-th imaging portion, and the granular object G, which is determined whether to have to be sorted out, is imaged. After that, the processing proceeds to step S4, in which the determiner 91 determines whether the sort-out necessity/unnecessity determination information is acquired.

If the determination in this step S4 is NO, i.e., the determiner 91 determines that the sort-out necessity/unnecessity determination information is not acquired, the processing returns to step S3, in which the imaging start signal is output to the N-th imaging portion again.

On the other hand, if the determination in step S4 is YES, i.e., the determiner 91 determines that the sort-out necessity/unnecessity determination information is acquired, the processing proceeds to step S5, in which the determiner 91 determines whether the granular object G corresponding to this acquired sort-out necessity/unnecessity determination information has to be sorted out.

If the determination in this step S5 is YES, i.e., the determiner 91 determines that the granular object G has to be sorted out, the processing proceeds to step S6, in which S+1 is substituted for S. After that, the processing proceeds to step S7. On the other hand, if the determination in step S5 is NO, the processing skips step S6 and proceeds to step S7.

In step S7, the determiner 91 determines whether all of imaging works are ended with respect to the granular object G, which is determined whether to have to be sorted out. If the determination in this step S7 is NO, i.e., all of imaging works are not ended, the processing returns to step S2, and the imaging work(s) by the remaining imaging portion(s) continues.

On the other hand, if the determination in step S7 is YES, i.e., all of imaging works are ended, the processing proceeds to step S8, in which the determiner 91 determines whether the number S of pieces of sort-out necessity/unnecessity determination information indicating that the sort-out is necessary is S=0.

If the determination in step S8 is YES, i.e., the granular object G is determined not to have to be sorted out in the data acquired from all of the imaging portions, the processing proceeds to step S9, in which the ejection operation by the ejector 61 is omitted. Then, the processing by the controller 9 is ended.

On the other hand, if the determination in step S8 is NO, i.e., the granular object G is determined to have to be sorted out one or more times in one or more pieces of data acquired from one or more imaging portions, the processing proceeds to step S10, in which the determiner 91 determines whether the number S of pieces of sort-out necessity/unnecessity determination information indicating that the sort-out is necessary is S=1.

If the determination in step S10 is YES, i.e., the granular object G is determined to have to be sorted out only in the data acquired from one imaging portion, the processing proceeds to step S11, in which the sort-out signal setter 93 sets, as the sort-out actuation signal X, the preset signal Z corresponding to the sort-out necessity/unnecessity determination information based on which the granular object G is determined to have to be sorted out, based on the setting signal table T. Then, the processing proceeds to step S13.

If the determination in step S10 is NO, i.e., the granular object G is determined to have to be sorted out two or more times in the data acquired from two or more imaging portions, the processing proceeds to step S12, in which the sort-out signal setter 93 selects, based on the setting signal table T, one from the preset signals Z respectively corresponding to the pieces of sort-out necessity/unnecessity determination information based on which the granular object G is determined to have to be sorted out to set the selected one as the sort-out actuation signal X. Then, the processing proceeds to step S13.

The controller 9 is configured to output the sort-out actuation signal X set in step S11 or step S12 to the ejector 61 in step S13. Then, the controller 9 actuates the ejector 61 to cause it to eject the compressed air toward the granular object G located in the sorting region P, thereby sorting out the granular object G and ending the processing by the controller 9.

In this manner, according to the first embodiment of the present invention, the optical sorting apparatus 1 allows the ejector 61 to be actuated only at a timing when the granular object G passes through the sorting region P even when this granular object G is determined to have to be sorted out two or more times in two or more pieces of sort-out necessity/unnecessity determination information, and allows the ejector 61 to be prevented from being actuated at a timing other than that. Therefore, the first embodiment can achieve the optical sorting apparatus 1 capable of accurately sorting out a foreign object and/or a defective product from the large number of granular objects G.

Further, the first embodiment of the present invention allows the optical sorting apparatus 1 to select the optimal sort-out actuation signal X for sorting out the granular object G in the sorting region P regardless of the number of pieces of sort-out necessity/unnecessity determination information acquired from the granular object G, and thus allows the optical sorting apparatus 1 to reliably sort out only the granular object G that is a foreign object or a defective product in the sorting region P, thereby being able to realize the optical sorting apparatus 1 having high sorting accuracy, which can be prevented from unintentionally sorting out the granular object G that is an acceptable product.

For example, when sorting out a granular object G1 that reacts only to the visible light ray or the near-infrared ray and a granular object G2 that reacts to both the visible light ray and the near-infrared ray from the large number of granular objects G, the optical sorting apparatus 1 can be prevented from unintentionally sorting out the granular object G that is an acceptable product by the ejector 61 in the sorting region P when attempting to sort out the granular object G2. Therefore, the sorting accuracy can be enhanced when the granular object G is sorted using both the visible light ray and the near-infrared ray.

Further, for example, when sorting out a granular object G3 that reacts to any one of the visible light ray, the near-infrared ray, and the X-ray, and a granular object G4 that reacts to at least two of the visible light ray, the near-infrared ray, and the X-ray from the large number of granular objects G, the optical sorting apparatus 1 can be prevented from unintentionally sorting out the granular object G that is an acceptable product by the ejector 61 in the sorting region P when attempting to sort out the granular object G4. Therefore, the first embodiment can realize the optical sorting apparatus 1 workable with high sorting accuracy when sorting the granular object G using the three pieces of sort-out necessity/unnecessity determination information using the visible light ray, the near-infrared ray, and the X-ray.

Further, according to the first embodiment of the present invention, the sort-out work is performed by changing the falling direction of the granular object G with the aid of a wind pressure due to the compressed air when the granular object G supposed to be sorted out passes through the sorting region P, and therefore the granular object G can be sorted efficiently with a simple and low-cost structure.

Figure 7:
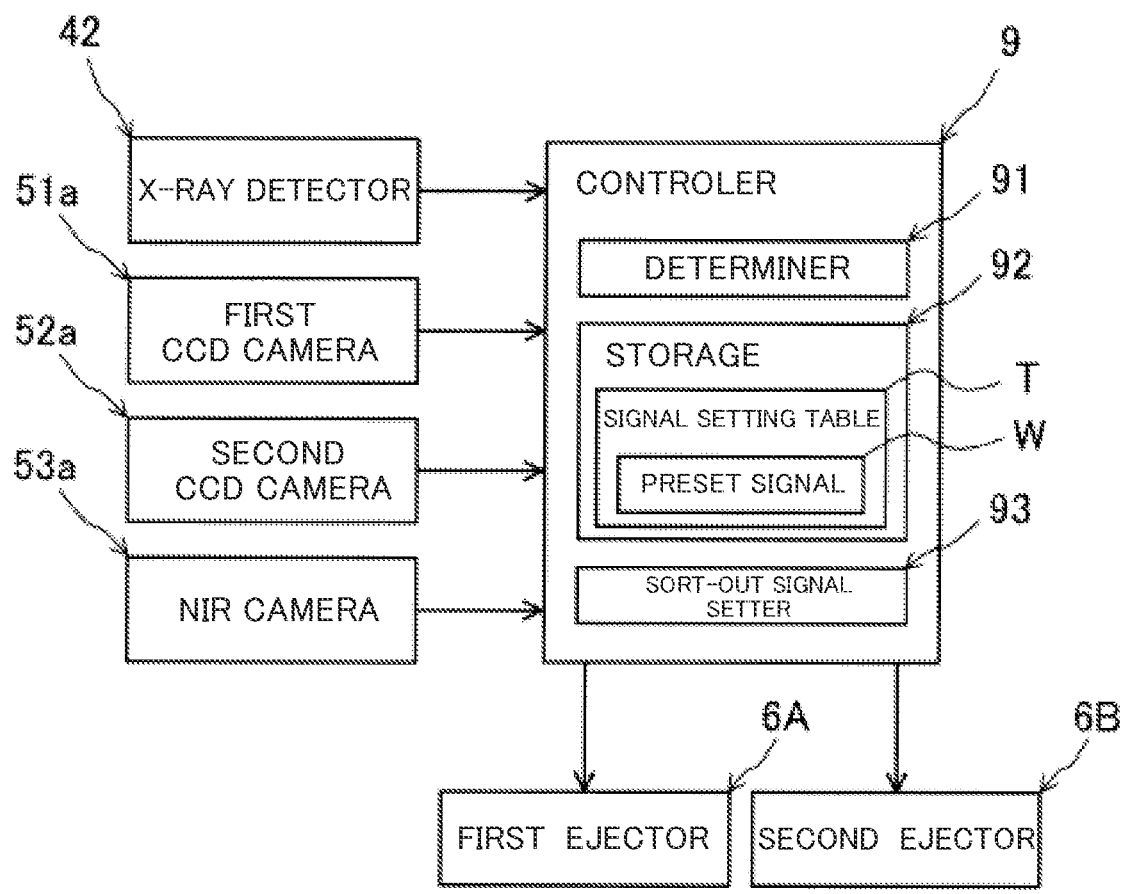
FIG. 7 is a diagram equivalent to FIG. 3 according to a second embodiment of the present invention.

<<Second Embodiment of the Invention>> FIG. 7 is a block diagram illustrating the relationship between the controller 9 and each configuration connected to the controller 9 in the optical sorting apparatus 1 according to a second embodiment of the present invention. The second embodiment is similar to the first embodiment except for such differences that two kinds of sorting portions; a first ejector 6A and a second ejector 6B are disposed in the sorting region P and the sort-out signal setter 93 sets each of a signal for the first ejector 6A and a signal for the second ejector 6B when setting the sort-out actuation signal X, and therefore will be described assigning the same reference numerals to portions equivalent to the first embodiment and focusing on only different portions other than the first embodiment.

In the second embodiment, the optical sorting apparatus 1 is configured in the following manner. In a case where defective products among the granular objects G can be classified into two types with respect to the combinations of pieces of data in which the granular object is determined to have to be sorted out based on the X-ray data D1, the visible light ray data D2, the visible light ray data D3, and the near-infrared ray data D4, a preset signal W1 and a preset signal W2 which respectively correspond to the combinations are stored in the signal setting table T in advance, and the sort-out signal setter 93 sets the preset signals W1 and W2 as the sort-out actuation signal X for the first ejector 6A and the sort-out actuation signal X for the second ejector 6B, respectively. This configuration allows the sorting unit 6 to sort one granular object G for each of the types of defective products. In this manner, the optical sorting apparatus 1 having a high sorting capability can be realized by disposing two or more sorting portions on the optical sorting apparatus 1 and using the controller 9 according to the present invention.

The sort-out signal setter 93 sets the sort-out actuation signal X based on the combination of the sort-out necessity/unnecessity determination results R1 to R4 from the predetermined signal setting table T in the first and second embodiments of the present invention, but the optical sorting apparatus is not limited thereto and may be configured to set the sort-out actuation signal X by, for example, calculating it using a predetermined signal calculation algorithm such as AI processing based on the combination of the sort-out necessity/unnecessity determination results R1 to R4.

Further, the CCD camera and the NIR camera are used as the imaging portions in the first and second embodiments of the present invention, but the optical sorting apparatus may be configured to acquire data using another type of imaging portion capable of acquiring data usable to sort the granular object G.

Further, the sort-out necessity/unnecessity determination information is acquired by imaging the granular object using the visible light ray, the near-infrared ray, and the X-ray in the first and second embodiments of the present invention, but the optical sorting apparatus is not limited thereto and may be configured to acquire the sort-out necessity/unnecessity determination information by imaging the granular object using another electromagnetic wave as necessary.

Further, the optical sorting apparatus is configured to sort out the granular object G using the compressed air in the sorting region P in the first and second embodiments of the present invention, but may be configured to sort out the granular object G using another type of sorting portion capable of changing the movement direction of the granular object G in motion in the air.

INDUSTRIAL APPLICABILITY

The present invention can be especially effectively usable for, for example, a sorting apparatus that sorts a sorting target by determining whether the sorting target has to be sorted out based on imaging data using a visible light ray, an X-ray, and/or the like.

DESCRIPTION OF THE REFERENCE NUMERALS 1 optical sorting apparatus
6 sorting unit (sorting portion)
42 X-ray detector (third imaging portion)
51a first CCD camera (first imaging portion)
52a second CCD camera (first imaging portion)
53a NIR camera (second imaging portion)
91 determiner (determination portion)
93 sort-out signal setter (sort-out signal setting portion)
D1 X-ray data
D2, D3 visible light ray data
D4 near-infrared ray data
G1 granular object (sorting target)
P sorting region
R sort-out necessity/unnecessity determination result
T signal setting table
V1 first inspection region
V2 second inspection region
W1, W2 preset signal
X sort-out actuation signal
Z preset signal

What is claimed is:

1. A sorting apparatus configured to sort a sorting target advancing in the air by one or more sorting portions, the sorting apparatus comprising:
   an imaging portion configured to acquire two or more pieces of sort-out necessity/unnecessity determination information by imaging the sorting target;
   a determination portion configured to determine whether the sorting target has to be sorted out based on the two or more pieces of sort-out necessity/unnecessity determination information and output a sort-out necessity/unnecessity determination result, which is a result of the determination; and
   a sort-out signal setting portion configured to, when one sorting target is determined to have to be sorted out two or more times in two or more of the sort-out necessity/unnecessity determination results respectively based on the two or more pieces of sort-out necessity/unnecessity determination information, set a sort-out actuation signal that contains information for actuating the sorting portion when the sorting target passes through a sorting region based on a combination of the sort-out necessity/unnecessity determination results from a predetermined signal setting table or calculate and set the sort-out actuation signal using a predetermined signal calculation algorithm based on the combination of the sort-out necessity/unnecessity determination results.

2. The sorting apparatus according to claim 1, wherein a preset signal containing the information for actuating the sorting portion is stored in the signal setting table in advance for each of the pieces of sort-out necessity/unnecessity determination information, and wherein the sort-out signal setting portion is configured to, when the sorting target is determined to have to be sorted out in only one of the sort-out necessity/unnecessity determination results determined by the determination portion, set, as the sort-out actuation signal, the preset signal corresponding to the sort-out necessity/unnecessity determination information based on which the sorting target is determined to have to be sorted out, and is further configured to, when the sorting target is determined to have to be sorted out two or more times in two or more of the sort-out necessity/unnecessity determination results determined by the determination portion, set, as the sort-out actuation signal, one of the respective preset signals corresponding to the pieces of sort-out necessity/unnecessity determination information based on which the sorting target is determined to have to be sorted out.

3. The sorting apparatus according to claim 2, wherein the imaging portion includes a first imaging portion configured to acquire visible light ray data as the sort-out necessity/unnecessity determination information by imaging the sorting target using visible light ray, and a second imaging portion configured to acquire near-infrared ray data as the sort-out necessity/unnecessity determination information by imaging the sorting target using near-infrared ray, and the sort-out signal setting portion is further configured to set, as the sort-out actuation signal, any one of the respective preset signals corresponding to the visible light ray data and the near-infrared ray data when the sorting target is determined to have to be sorted out in each of the sort-out necessity/unnecessity determination results based on the visible light ray data and the near-infrared ray data.

4. The sorting apparatus according to claim 3, wherein the sorting portion is an air ejection portion configured to eject compressed air from an ejection nozzle toward the sorting target, and the preset signal contains information indicating a delay time taken until the sort-out actuation signal is output to the sorting portion after the imaging portion images the sorting target, and an ejection time for which the sort-out actuation signal is kept output to the sorting portion.

5. The sorting apparatus according to claim 2, wherein the imaging portion includes a first imaging portion configured to acquire visible light ray data as the sort-out necessity/unnecessity determination information by imaging the sorting target using visible light ray, a second imaging portion configured to acquire near-infrared ray data as the sort-out necessity/unnecessity determination information by imaging the sorting target using near-infrared ray, and a third imaging portion configured to acquire X-ray data as the sort-out necessity/unnecessity determination information by imaging the sorting target using X-ray, and the sort-out signal setting portion is further configured to, when the sorting target is determined to have to be sorted out in each of at least two or more of the respective sort-out necessity/unnecessity determination results based on the visible light ray data, the near-infrared ray data, and the X-ray data, set, as the sort-out actuation signal, one signal out of the preset signals respectively corresponding to the sort-out necessity/unnecessity determination results in which the sorting target is determined to have to be sorted out.

6. The sorting apparatus according to claim 5, wherein the sorting portion is an air ejection portion configured to eject compressed air from an ejection nozzle toward the sorting target, and the preset signal contains information indicating a delay time taken until the sort-out actuation signal is output to the sorting portion after the imaging portion images the sorting target, and an ejection time for which the sort-out actuation signal is kept output to the sorting portion.

7. The sorting apparatus according to claim 2, wherein the sorting portion is an air ejection portion configured to eject compressed air from an ejection nozzle toward the sorting target, and the preset signal contains information indicating a delay time taken until the sort-out actuation signal is output to the sorting portion after the imaging portion images the sorting target, and an ejection time for which the sort-out actuation signal is kept output to the sorting portion.

* * * * *